United States Patent
Xiao et al.

(10) Patent No.: US 12,038,491 B2
(45) Date of Patent: Jul. 16, 2024

(54) UNDERWATER ACOUSTIC TARGET RANGING METHOD BASED ON FEATURE EXTRACTION AND NEURAL NETWORK

(71) Applicant: SOOCHOW UNIVERSITY, Suzhou (CN)

(72) Inventors: Zhongzhe Xiao, Suzhou (CN); Min Huang, Suzhou (CN); Junjun Jiang, Suzhou (CN); Tuo Shi, Suzhou (CN); Di Wu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 345 days.

(21) Appl. No.: 17/606,920

(22) PCT Filed: Aug. 24, 2020

(86) PCT No.: PCT/CN2020/110815
§ 371 (c)(1),
(2) Date: Oct. 27, 2021

(87) PCT Pub. No.: WO2021/237958
PCT Pub. Date: Dec. 2, 2021

(65) Prior Publication Data
US 2022/0317273 A1    Oct. 6, 2022

(30) Foreign Application Priority Data

May 27, 2020  (CN) .......................... 202010463267.X

(51) Int. Cl.
*G01S 11/14* (2006.01)
(52) U.S. Cl.
CPC ..................................... *G01S 11/14* (2013.01)
(58) Field of Classification Search
CPC .................................. G01H 3/00; G01S 11/14
See application file for complete search history.

(56) References Cited

U.S. PATENT DOCUMENTS 7,392,733 B1 * 7/2008 Kuklinski ................ F41F 3/10
                                                     89/37.06
8,655,655 B2 * 2/2014 Wang ..................... G10L 25/48
                                                     704/239

(Continued)

FOREIGN PATENT DOCUMENTS

| CN | 102799892 A | 11/2012 |
| CN | 109932708 A | 6/2019 |
| WO | 2019014253 A1 | 1/2019 |

OTHER PUBLICATIONS

Wang et al., "Feature Extraction of Underwater Target in Auditory Sensation Area Based on MFCC" IEEE/OES China Ocean Acoustics Symposium, Jan. 11, 2016.

*Primary Examiner* — Elias Desta
(74) *Attorney, Agent, or Firm* — SZDC Law PC

(57) ABSTRACT

The present invention provides an underwater acoustic target ranging method based on feature extraction and a neural network, including: acquiring underwater acoustic signals transmitted by an underwater acoustic target at different distances, dividing data by seconds, and using data of one second as one sample; performing framing on each sample; and separately calculating a zero-crossing rate of a time domain waveform, the second, fifth, and eighth coefficients of MFCC, a spectral centroid, a spectral skewness, a spectral entropy, and a spectral sharpness for each frame of data of each sample. In the underwater acoustic target ranging method based on feature extraction and a neural network provided in the present invention, the received underwater acoustic signal data is directly processed, so that the real-time performance is high and the reaction speed is fast.

7 Claims, 1 Drawing Sheet

(56) References Cited

U.S. PATENT DOCUMENTS

| | | | |
|---|---|---|---|
| 9,705,607 B2 * | 7/2017 | Dugan | A01K 29/005 |
| 9,829,565 B1 | 11/2017 | Crocker | |
| 9,892,744 B1 * | 2/2018 | Salonidis | G05B 23/0237 |

* cited by examiner

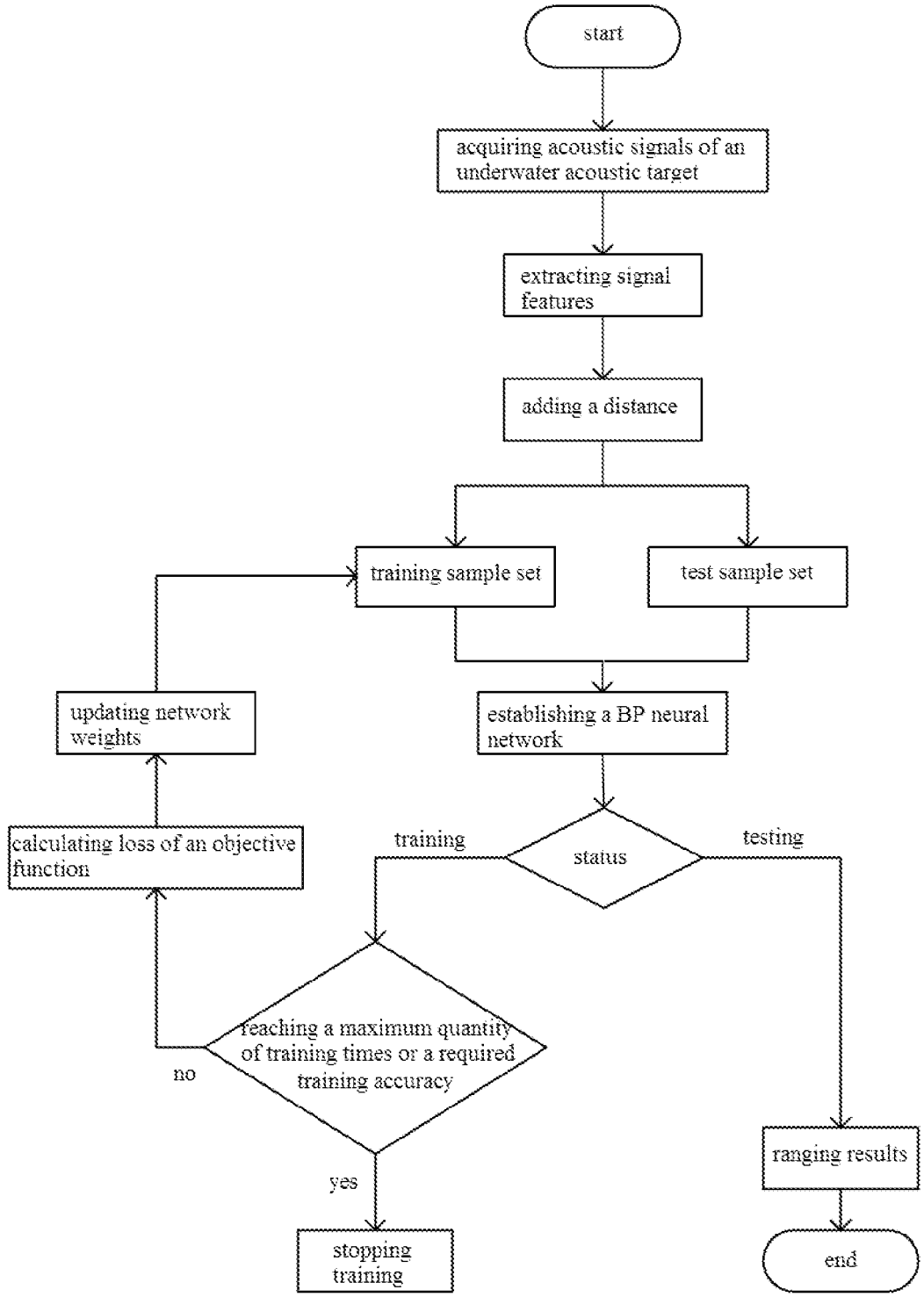

UNDERWATER ACOUSTIC TARGET RANGING METHOD BASED ON FEATURE EXTRACTION AND NEURAL NETWORK

This application is the National Stage Application of PCT/CN2020/110815, filed on Aug. 24, 2020, which claims priority to Chinese Patent Application No. 202010463267.X, filed on May 27, 2020, which is incorporated by reference for all purposes as if fully set forth herein.

FIELD OF THE INVENTION

The present invention relates to the field of underwater acoustic target ranging, and more particularly to an underwater acoustic target ranging method based on feature extraction and a neural network.

DESCRIPTION OF THE RELATED ART

At present, various countries are increasingly concerned about marine consumption, industry, and forces and conduct related researches intensively. China still falls behind in this. Therefore, as China speeds up its military automation, it is urgent to promote the research of underwater acoustic target recognition.

In original underwater acoustic target recognition, an observer mainly relies on experience and subjective judgment to determine the presence and distance of a target. Such a method is inadequate. Acoustic signal theories and modern spectrum theories are adopted later to perform underwater acoustic target recognition, and the recognition accuracy and efficiency are somewhat improved. However, currently, as sensors become more varied, the amount of information keeps growing, and noise interference increases in underwater environments, the problem of underwater acoustic target recognition becomes increasingly complex. Therefore, conventional methods gradually fail to satisfy current requirements. An artificial intelligence method (for example, a neural network) is clearly superior for handling those recognition problems with complex environmental information and limited background knowledge.

Conventional technologies have the following technical problems:

1. CN110488300A discloses an underwater acoustic positioning system and method. In the method, a depth sensor needs to be mounted on a target to be positioned to transmit depth information. Therefore, a target without a depth sensor cannot be positioned. In addition, the use of a single array element transducer to test slant-range information is highly susceptible to interference in underwater environments, and there is a relatively large measurement error, resulting in a relatively large positioning error.
2. CN110208745A discloses an underwater acoustic positioning method based on an adaptive matched filter. In the method, a specific position of a target to be positioned is acquired by using a time difference between two signals, and a fixed band sound signal emission system needs to be mounted at the target to be positioned, and one FPGA core control chip, four hydrophones, four AD processors, four signal amplifiers, and one Ethernet transmission module are required. A number of various types of devices are required, resulting in a relatively high cost.
3. CN110542883A discloses a passive underwater acoustic positioning method for a silent target. In the method, a navigational baseline node array needs to be arranged on the water surface, and the nodes need to synchronously emit navigation signals. As a result, the method cannot be used to position a target to be positioned in real time. In addition, the method is mainly used for positioning the target to be positioned itself but cannot be used by another device or system to position the target to be positioned.

SUMMARY OF THE INVENTION

A technical problem to be solved by the present invention is to provide an underwater acoustic target ranging method based on feature extraction and a neural network. First, a large number of underwater acoustic signals transmitted by an underwater acoustic target at different distances are acquired, features are extracted, and then these features and corresponding distance labels are inputted into an established neural network to perform training. In an actual application, it is only necessary to acquire nearby underwater acoustic signals and extract features, and the features are inputted into a trained neural network to implement the ranging of the underwater acoustic target. The method has a fast response speed and high real-time performance, and can be implemented by using only one hydrophone and one upper computer. The method requires a few devices, has a low cost, and is less susceptible to environmental impact. An average relative error of ranging is less than 20%, so that the reliability is high.

To resolve the foregoing technical problems, the present invention provides an underwater acoustic target ranging method based on feature extraction and a neural network, including:

step (1): acquiring underwater acoustic signals transmitted by an underwater acoustic target at different distances, dividing data by seconds, and using data of one second as one sample;

step (2): performing framing on each sample;

step (3): separately calculating a zero-crossing rate of a time domain waveform, the second, fifth, and eighth coefficients of MFCC, a spectral centroid, a spectral skewness, a spectral entropy, and a spectral sharpness for each frame of data of each sample;

step (4): separately calculating a first quartile, a second quartile, a third quartile, a 1% percentile, a 99% percentile, an arithmetic mean, a quadratic mean, and a peak mean for zero-crossing rates, the second, fifth, and eighth coefficients of MFCC, spectral centroids, spectral skewnesses, spectral entropies, and spectral sharpnesses calculated for all frames in each sample;

step (5): combining 64 values calculated in the fourth step into a 64-dimensional feature for use as a feature of the sample;

step (6): adding a distance label to each sample according to distance information of the underwater acoustic target at a moment of each sample;

step (7): combining features of all samples and corresponding distance labels into a sample set, randomly extracting two thirds of the features for use as a training sample set, and using the remaining one third as a test sample set;

step (8): establishing a neural network model, inputting the training sample set to perform training, and stopping training when a required training accuracy is reached or a maximum quantity of training times is reached; and step (9): inputting the test sample set to perform testing, where if a test error meets a requirement, parameters of the model are saved for actual use, or if a test error does not meet a requirement, the process returns to the step (8) to perform training again.

In an embodiment, the zero-crossing rate is defined as:

$$ZCR = \sum_{q=1}^{N-1} s(q) \begin{cases} s(q) = 1 \; x(q+1) \cdot x(q) < 0 \\ s(q) = 0 \; \text{else} \end{cases},$$

where N is a quantity of sampling points in each frame, and x(q) is an amplitude of a $q_{th}$ sampling point.

In an embodiment, the spectral centroid is defined as:

$$\text{Centroid} = \frac{\sum_{n=1}^{N} f(n) \cdot E(n)}{\sum_{n=1}^{N} E(n)},$$

where f is a frequency of a signal, and E is energy of the corresponding frequency.

In an embodiment, the spectral skewness is defined as:

$$\text{Skewness} = E\left[\left(\frac{X-\mu}{\sigma}\right)^3\right] = \frac{k_3}{\sigma^3} = \frac{k_3}{k_2^{3/2}},$$

where $k_2$ and $k_3$ are respectively a second-order central moment and a third-order central moment of a spectral amplitude, X is the spectral amplitude, and μ and σ are respectively a mean and a variance of X.

In an embodiment, the spectral entropy is defined as:

$$\text{Entropy} = -\sum_{x} p(x) \log p(x),$$

where x is an event that a spectral amplitude is in one interval, p(x) is a probability of the event x, and an interval between a minimum value and a maximum value of the spectral amplitude is divided into 100 subintervals, that is, 100 events.

In an embodiment, the spectral sharpness is defined as:

$$\text{Sharpness} = \frac{\sum_{f=1000}^{fs/2} E(f)}{\sum_{f=1}^{fs/2} E(f)},$$

where E(f) is energy at a frequency of f Hz.

In an embodiment, in the step (2), parameters of the framing are as follows: a frame length is set to 20 ms, and a frame shift is set to 10 ms.

Based on the same inventive concept, this application further provides a computer device, including a memory, a processor, and a computer program that is stored in the memory and is executable by processor, where the processor is configured to execute the program to implement the steps in any method.

Based on the same inventive concept, this application further provides a computer-readable storage medium, on which a computer program is stored, where the program is executed by a processor to implement the steps in any method.

Based on the same inventive concept, this application further provides a processor, configured to execute a program, where the program is executed to perform any method.

Beneficial effects of the present invention are as follows:

1. In the underwater acoustic target ranging method based on feature extraction and a neural network provided in the present invention, the received underwater acoustic signal data is directly processed, so that the real-time performance is high and the reaction speed is fast.
2. In the underwater acoustic target ranging method based on feature extraction and a neural network provided in the present invention, ranging is performed on an underwater acoustic target by using an artificial intelligence method, to avoid manual intervention, and a quantity of dimensions of features is small, thereby increasing the accuracy and speed of underwater acoustic target ranging.
3. The underwater acoustic target ranging method based on feature extraction and a neural network provided in the present invention can be implemented by using only one hydrophone and one upper computer, requires a few devices, and has a low cost.
4. The underwater acoustic target ranging method based on feature extraction and a neural network provided in the present invention is less susceptible to environmental impact. An average relative error of ranging is less than 20%, so that the reliability is high.

BRIEF DESCRIPTION OF THE DRAWINGS

FIG. 1 is a schematic flowchart of an underwater acoustic target ranging method based on feature extraction and a neural network according to the present invention.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not intended to limit the present invention.

1. Underwater acoustic signals transmitted by an underwater acoustic target at different distances are acquired, data is divided by seconds, and data of one second is used as one sample.
2. Framing is performed on each sample, where a frame length is set to 20 ms, and a frame shift is set to 10 ms.
3. A zero-crossing rate of a time domain waveform, the second, fifth, and eighth coefficients of MFCC, a spectral centroid, a spectral skewness, a spectral entropy, and a spectral sharpness are separately calculated for each frame of data of each sample.

The zero-crossing rate (ZCR) is defined as:

$$ZCR = \sum_{q=1}^{N-1} s(q) \begin{cases} s(q) = 1 \; x(q+1) \cdot x(q) < 0 \\ s(q) = 0 \; \text{else} \end{cases},$$

where N is a quantity of sampling points in each frame, and x(q) is an amplitude of a $q^{th}$ sampling point.

The spectral centroid is defined as:

$$\text{Centroid} = \frac{\sum_{n=1}^{N} f(n) \cdot E(n)}{\sum_{n=1}^{N} E(n)},$$

where f is a frequency of a signal, and E is energy of the corresponding frequency;

The spectral skewness is defined as:

$$\text{Skewness} = E\left[\left(\frac{X-\mu}{\sigma}\right)^3\right] = \frac{k_3}{\sigma^3} = \frac{k_3}{k_2^{3/2}},$$

where $k_2$ and $k_3$ are respectively a second-order central moment and a third-order central moment of a spectral amplitude, X is the spectral amplitude, and $\mu$ and $\sigma$ are respectively a mean and a variance of X.

The spectral entropy is defined as:

$$\text{Entropy} = -\sum_{x} p(x) \log p(x),$$

where x is an event that a spectral amplitude is in one interval, p(x) is a probability of the event x, and an interval between a minimum value and a maximum value of the spectral amplitude is divided into 100 subintervals, that is, 100 events.

The spectral sharpness is defined as:

$$\text{Sharpness} = \frac{\sum_{f=1000}^{fs/2} E(f)}{\sum_{f=1}^{fs/2} E(f)},$$

where E(f) is energy at a frequency of f Hz.

4. A first quartile, a second quartile, a third quartile, a 1% percentile, a 99% percentile, an arithmetic mean, a quadratic mean, and a peak mean are separately calculated for zero-crossing rates, the second, fifth, and eighth coefficients of MFCC, spectral centroids, spectral skewnesses, spectral entropies, and spectral sharpnesses calculated for all frames in each sample.

5. 64 values calculated in the step (4) are combined into a 64-dimensional feature for use as a feature of the sample.

6. A distance label is added to each sample according to distance information of the underwater acoustic target at a moment of each sample.

7. Features of all samples and corresponding distance labels are combined into a sample set, two thirds of the features are randomly extracted for use as a training sample set, and the remaining one third is used as a test sample set.

8. A neural network model is established, the training sample set is inputted to perform training, and training is stopped when a required training accuracy is reached or a maximum quantity of training times is reached.

9. The test sample set is inputted to perform testing, where if a test error meets a requirement, parameters of the model are saved for actual use, or if a test error does not meet a requirement, the process returns to the step (8) to perform training again.

10. During actual use, nearby underwater acoustic signals are acquired, and the foregoing 64-dimensional feature is extracted and inputted into the model saved in the step (9), so that a ranging result of the underwater acoustic target can be obtained.

A specific application scenario of the present invention is given below:

1. Underwater acoustic signals transmitted by a real ship at different distances in three sea areas are acquired, data is divided by seconds, and data of one second is used as one sample.

2. Framing is performed on each sample, where a frame length is set to 20 ms, and a frame shift is set to 10 ms.

3. A zero-crossing rate of a time domain waveform, the second, fifth, and eighth coefficients of MFCC, a spectral centroid, a spectral skewness, a spectral entropy, and a spectral sharpness are separately calculated for each frame of data of each sample.

4. A first quartile, a second quartile, a third quartile, a 1% percentile, a 99% percentile, an arithmetic mean, a quadratic mean, and a peak mean are separately calculated for zero-crossing rates, the second, fifth, and eighth coefficients of MFCC, spectral centroids, spectral skewnesses, spectral entropies, and spectral sharpnesses calculated for all frames in each sample.

5. 64 values calculated in the step (4) are combined into a 64-dimensional feature for use as a feature of the sample.

6. A distance label is added to each sample according to distance information of the underwater acoustic target at a moment of each sample.

7. Features of all samples and corresponding distance labels are combined into a sample set, two thirds of the features are randomly extracted for use as a training sample set, and the remaining one third is used as a test sample set.

8. ABP neural network is established, and parameters of BP neural network are set to: 64 input neurons, one hidden layer, 20 hidden neurons, an activate function of an S transfer function, one output neuron, a gradient descent BP algorithm training function, a loss function of a mean squared error (MSE), a required training accuracy of $10^{-9}$, a maximum quantity of training times is 2000, and an initial learning rate is 0.1.

9. The training sample set is inputted to perform training, and training is stopped when a required training accuracy is reached or a maximum quantity of training times is reached.

10. The test sample set is inputted to perform testing. Average relative errors of ranging of the real ship in the three sea areas are all less than 20%.

Key points of the present invention are as follows:

1. The underwater acoustic target ranging method based on feature extraction and a neural network provided in the present invention is based on a large amount of sound signal data of an actual underwater acoustic target, and the underwater acoustic target has greatly varying distances, and a trained neural network model has high generalization capability and anti-interference capability.

2. In the underwater acoustic target ranging method based on feature extraction and a neural network provided in the present invention, extracted features are a first quartile, a second quartile, a third quartile, a 1% percentile, a 99% percentile, an arithmetic mean, a quadratic mean, and a peak mean of zero-crossing rates, the second, fifth, and eighth coefficients of MFCC, spectral centroids, spectral skewnesses, spectral entropies, and spectral sharpnesses of all frames in each sample. These features form a 64-dimensional feature vector.

3. In the underwater acoustic target ranging method based on feature extraction and a neural network provided in the present invention, a neural network is used to perform ranging on an underwater acoustic target.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A device consisting of a hydrophone and an upper computer, wherein the upper computer including a memory, a processor, and a computer program that is stored in the memory and is executable by processor; and the processor is configured to execute an underwater acoustic target ranging method based on feature extraction and a neural network, the underwater acoustic target ranging method comprising:
   step (1): acquiring underwater acoustic signals transmitted by an underwater acoustic target at different distances, dividing data by seconds, and using data of one second as one sample;
   step (2): performing framing on each sample;
   step (3): separately calculating a zero-crossing rate of a time domain waveform, the second, fifth, and eighth coefficients of MFCC, a spectral centroid, a spectral skewness, a spectral entropy, and a spectral sharpness for each frame of data of each sample;
   step (4): separately calculating a first quartile, a second quartile, a third quartile, a 1% percentile, a 99% percentile, an arithmetic mean, a quadratic mean, and a peak mean for zero-crossing rates, the second, fifth, and eighth coefficients of MFCC (mel-frequency cepstral coefficients), spectral centroids, spectral skewnesses, spectral entropies, and spectral sharpnesses calculated for all frames in each sample;
   step (5): combining 64 values calculated in the step (4) into a 64-dimensional feature for use as a feature of the sample;
   step (6): adding a distance label to each sample according to distance information of the underwater acoustic target at a moment of each sample;
   step (7): combining features of all samples and corresponding distance labels into a sample set, randomly extracting two thirds of the features for use as a training sample set, and using the remaining one third as a test sample set;
   step (8): establishing a neural network model, inputting the training sample set to perform training, and stopping training when a required training accuracy is reached or a maximum quantity of training times is reached; and
   step (9): inputting the test sample set to perform testing, wherein if a test error meets a requirement, parameters of the model are saved for actual use, or if a test error does not meet a requirement, the method returns to the step (8) to perform training again.

2. The device according to claim 1, wherein the zero-crossing rate is defined as:

$$ZCR = \sum_{q=1}^{N-1} s(q) \begin{cases} s(q) = 1 \ x(q+1) \cdot x(q) < 0 \\ s(q) = 0 \ \text{else} \end{cases},$$

wherein N is a quantity of sampling points in each frame, and x(q) is an amplitude of a $q^{th}$ sampling point.

3. The device according to claim 1, wherein the spectral centroid is defined as:

$$\text{Centroid} = \frac{\sum_{n=1}^{N} f(n) \cdot E(n)}{\sum_{n=1}^{N} E(n)},$$

wherein f is a frequency of a signal, n is an integer, and E is energy of the corresponding frequency.

4. The device according to claim 1, wherein the spectral skewness is defined as:

$$\text{Skewness} = E\left[\left(\frac{X-\mu}{\sigma}\right)^3\right] = \frac{k_3}{\sigma^3} = \frac{k_3}{k_2^{3/2}},$$

wherein $k_2$ and $k_3$ are respectively a second-order central moment and a third-order central moment of a spectral amplitude, X is the spectral amplitude, and μ and σ are respectively a mean and a variance of X.

5. The device according to claim 1, wherein the spectral entropy is defined as:

$$\text{Entropy} = -\sum_{x} p(x) \log p(x),$$

wherein x is an event that a spectral amplitude is in one interval, p(x) is a probability of the event x, and an interval between a minimum value and a maximum value of the spectral amplitude is divided into 100 subintervals, that is, 100 events.

6. The device according to claim 1, wherein the spectral sharpness is defined as:

$$\text{Sharpness} = \frac{\sum_{f=1000}^{fs/2} E(f)}{\sum_{f=1}^{fs/2} E(f)},$$

wherein E(f) is energy at a frequency of f Hz.

7. The device according to claim 1, wherein in the step (2), parameters of the framing are as follows: a frame length is set to 20 ms, and a frame shift is set to 10 ms.

* * * * *